United States Patent
Sukenik

[11] 3,908,755
[45] Sept. 30, 1975

[54] SAFETY SYSTEM FOR PRESSURIZED VESSELS

[75] Inventor: Robert J. Sukenik, Bloomfield Hills, Mich.

[73] Assignee: New Hudson Corporation, New Hudson, Mich.

[22] Filed: Aug. 8, 1973

[21] Appl. No.: 386,841

[52] U.S. Cl. .............................. 165/89; 220/88 R
[51] Int. Cl.² ............................................ F28F 5/02
[58] Field of Search .............. 34/124, 125, 140–142; 165/1, 2, 4–10, 89–95; 122/367 PF; 23/290; 220/26, 88 R

[56] References Cited
UNITED STATES PATENTS

| | | | |
|---|---|---|---|
| 1,222,922 | 4/1917 | Bone et al. ..................... | 122/367 PF |
| 1,487,248 | 3/1924 | Lantz ................................. | 165/89 |
| 1,795,348 | 3/1931 | Schmidt ............................ | 165/95 |
| 2,102,152 | 12/1937 | Hays ................................. | 122/367 PF |
| 2,166,245 | 7/1939 | Goft et al. ........................ | 34/125 |
| 2,956,348 | 10/1960 | Mueller............................. | 165/89 |
| 3,703,976 | 11/1972 | Hughes et al. .................... | 220/88 R |
| 3,773,168 | 11/1973 | Meinass ........................... | 220/88 R |

FOREIGN PATENTS OR APPLICATIONS

| | | | |
|---|---|---|---|
| 652,290 | 10/1928 | France .............................. | 165/10 |

Primary Examiner—Charles J. Myhre
Assistant Examiner—Theophil W. Streule, Jr.
Attorney, Agent, or Firm—Harness, Dickey & Pierce

[57] ABSTRACT

A pressurized vessel such as a steam heated roll or a boiler is filled with loose filler material, for example, beads or hollow spheres, having a low density. This material displaces a substantial volume of steam or other pressurized gas and thereby reduces the explosive capability of the vessel.

In an embodiment especially useful in boilers, the filler material is so designed that the pressurized steam will penetrate the filler material and the pressure in each element will be released at a safe rate in case of explosion.

11 Claims, 5 Drawing Figures

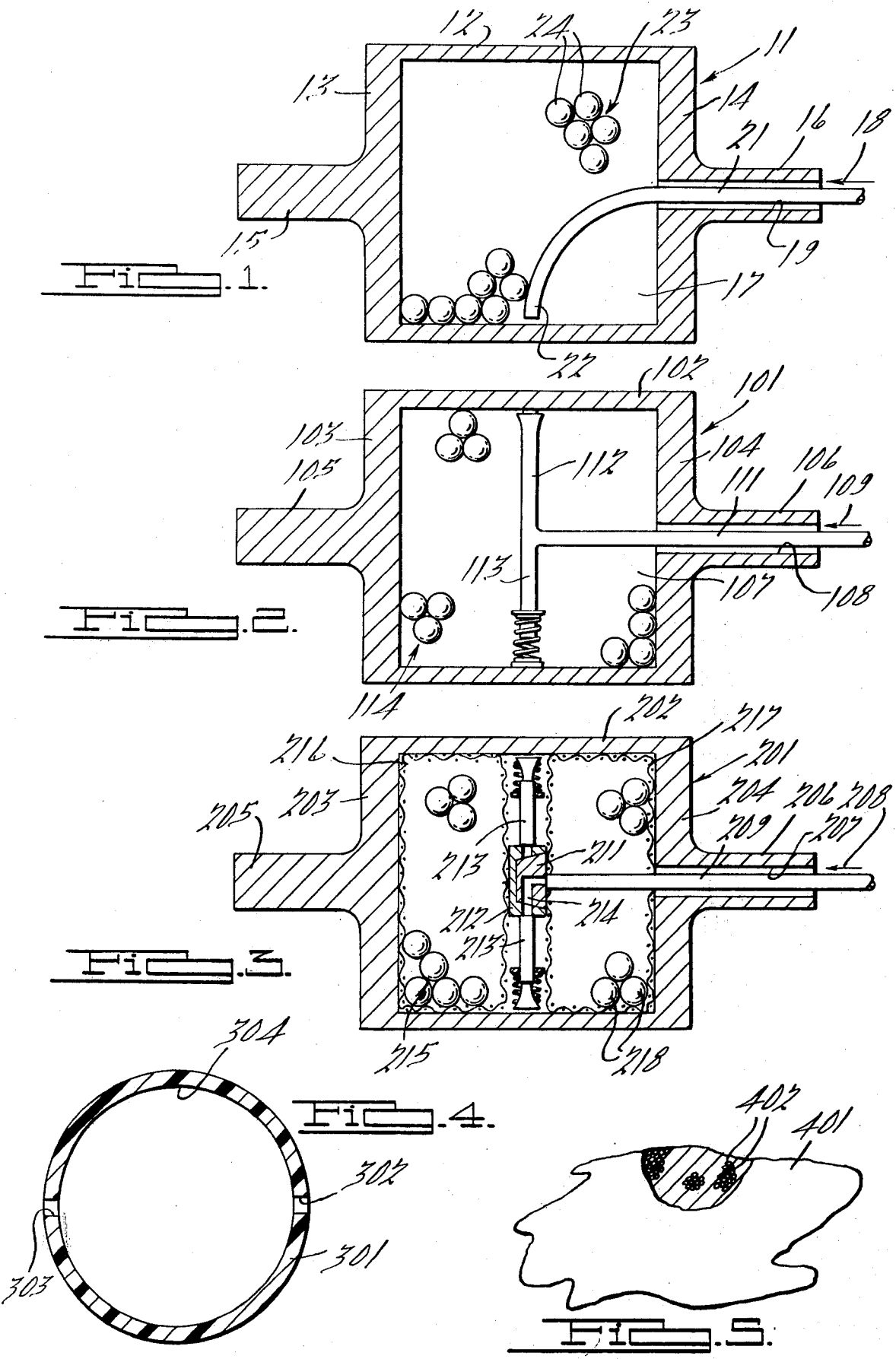

SAFETY SYSTEM FOR PRESSURIZED VESSELS

BACKGROUND OF THE INVENTION

1. Field of the Invention

The invention relates to the safety of steam heated rolls, steam boilers and other vessels which are pressurized with steam or another gas such as air, argon, etc. The pressurized vessels in many industries are subject to special design and test rules before they are approved. For example, steam heated dryer rolls used in the paper industry and various rolls used in the textile and plastic industries are presently made by designing a closed vessel according to special design rules specified by the American Society of Mechanical Engineers (ASME), as well as various state and local codes. The design and construction of these vessels is complicated by the fact that mechanical loads must be taken into account in addition to the stresses caused by the internal pressure. Since each manufacturer of equipment has unique operating conditions in mind, the manufacturer usually submits the design calculations to the ASME and they in turn approve these calculations. The inclusion of significant mechanical loads applied to the pressure vessel makes the task of the ASME very difficult and costly, since it must be expert in many industries and understand complicated operating conditions. The result is that in such cases the ASME generally approves the manufacturers' calculations. Next, the pressure vessel is constructed in accordance with the ASME and other codes, usually requiring expensive and time-consuming steps such as witnesses of welding quality, various certifications and tests. When the pressure vessel is put into service it is exposed by the operating personnel to sometimes unexpected operating conditions. Hidden corrosion can occur, weakening the vessel. Even with careful manufacturing quality control, concealed defects in manufacture can occur, resulting in field failure after an extended period of use.

The typical field failure of such vessels is a violent explosion, usually with the loss of property and sometimes personal injury and loss of life.

DESCRIPTION OF THE PRIOR ART

A novelty search on the subject of this invention failed to reveal any anticipatory prior art. The following patents were noted: Lennig U.S. Pat. No. 1,528,494 Mar. 3, 1925; Jones U.S. Pat. No. 1,819,988 Aug. 18, 1931; List U.S. Pat. No. 3,369,598 Feb. 20, 1968; St. Clair U.S. Pat. No. 3,493,344 Feb. 3, 1970; Crowell U.S. Pat. No. 1,642,361 Sept. 13, 1927; Fues U.S. Pat. No. 695,041 Mar. 1902.

BRIEF SUMMARY OF THE INVENTION

It is an object of the present invention to reduce or eliminate the above-described problems with respect to the manufacture of pressurized vessels, and to provide a safety system for such vessels minimizing the danger of explosions which would result in injury, loss of life or property.

It is another object to provide a novel and improved safety system for pressure vessels which is especially useful for boilers and other vessels which must accumulate and store a substantial volume of steam to take care of intermittent demands.

It is a further object to provide an improved safety system of this character useful for either low speed or high speed rolls.

It is another object to provide an improved safety system of this character which could potentially result in such an increase in safety that some steam heated pressure vessels would no longer be classified as pressure vessels under the ASME code and thereby be less expensive to manufacture, providing advantages to the user by costing less for insurance and being a minimum risk.

Briefly, the illustrated embodiments of the invention each comprises a pressurized gas vessel, and filler material in the form of loose particles within said vessel and occupying a major portion of its internal volume, said filler material having a relatively light density, the volume occupied by the filler material being sufficient to significantly reduce the danger of explosion in the event of failure of the vessel, the average density of the filler material being sufficiently low so that in case of a sudden release of pressure from the vessel, the particles will not become dangerous projectiles propelled by the pressurized gas. In one embodiment of the invention, the particles of filler material are so fabricated that they will permit entry and release of the pressurized gas at a controlled rate, thereby providing a safe source of accumulated steam where it is necessary to store a volume of steam in the vessel.

BRIEF DESCRIPTION OF THE DRAWINGS

FIG. 1 is a schematic cross-sectional view in elevation showing the pressurized vessel in the form of a roll having the filler material of this invention disposed therein, the vessel having a stationary siphon.

FIG. 2 is a view similar to FIG. 1 of another embodiment of the invention showing a rotating siphon for high speed rolls.

FIG. 3 is a view similar to FIG. 1, but showing a nonrotating siphon pipe connected by an internal distributor valve to rotating siphon tubes, the material having nets to prevent the particles of material from becoming projectiles in the event of vessel failure.

FIG. 4 is an enlarged cross-sectional view of a spherical member with metering orifices to be used as the filler material.

FIG. 5 is an enlarged and partially sectioned view of an alternative form of filler material particle which will accumulate and release pressurized gas at a controlled rate.

DESCRIPTION OF THE PREFERRED EMBODIMENTS

Referring first to the embodiment of FIG. 1, a pressure vessel is generally indicated at 11 in the form of a roll having a cylindrical portion 12 and end plates 13 and 14 carrying journals 15 and 16 respectively. The showing of vessel 11 in FIG. 1 is schematic and it should be understood that the invention is applicable to pressurized gas vessels other than steam heated rolls. As shown, vessel 11 has a cylindrical volume 17 to which pressurized steam is supplied by means indicated schematically at 18 through a passage 19 in journal 16. Assuming that roll 11 rotates slowly, the condensate will collect at the bottom and be removed by a stationary siphon in the form of a tube 21 extending through passage 19 and curving downwardly to a mouth 22 spaced a slight distance from the bottom of the roll.

According to the invention, space 17 of vessel 11 is loosely filled with a lightweight volume—displacing filler material indicated generally at 23. The filler material comprises a multitude of particles 24, preferably of an inert and heat-resistant material and of a relatively low average density. Examples of such particles could be beads, hollow glass spheres, hollow plastic spheres, foamed cellular materials without cell interconnection, or hollow metal spheres. The particles may be of any appropriate shape or size and are such that the pressurized steam or other gas will not penetrate them. The use of this type of particle is especially adapted for rolls or other vessels where the function, for example, is heat transfer and it is not required that a large volume of steam or other gas be stored. The presence of material 23 in space 17 will greatly reduce the volume of steam or other pressurized gas therein and thereby reduce the explosive capability of the vessel. In case of vessel failure, the relatively low volume of steam or other pressurized gas in space 17 will mean that there will be no dangerous explosion.

FIG. 2 shows another embodiment of the invention, the vessel being generally indicated at 101 in the form of a roll having a cylindrical portion 102, end plates 103 and 104, and journals 105 and 106. In this case, the roll rotates at a relatively fast speed so that the condensate will "rim," that is, be held against the outer surface of space 107 by centrifugal force. The steam will be fed through a space 108 in journal 106 by means indicated schematically at 109. A rotating condensate pipe 111 passes through space 108 and has a radial branch or branches 112 and 113 for picking up the condensate.

As in the previous embodiment, loose filler material generally indicated at 114 fills most of space 107, the effect of this material being the same as material 23 previously described.

FIG. 3 shows still another embodiment of the invention in which the roll is generally indicated at 201 and is of the slowly rotating type. The roll has a cylindrical portion 202, end plates 203 and 204 and journals 205 and 206. A passage 207 in journal 206 admits steam by means indicated schematically at 208. A non-rotating axial siphon pipe 209 extends through passage 207 and is connected with a head 211 inside a rotating member 212 which carries radially extending siphon tubes 213. The assembly comprising member 212 and tubes 213 rotates with roll 201. A downwardly extending passage 214 in head 211 will connect siphon pipe 209 with successive tubes 213 as they reach the bottom of their rotational movement.

The filler material generally indicated at 215 is contained in this embodiment by netting or other enclosures 216 and 217. These enclosures could be fabricated as screens or other barriers which would not impede the flow of steam but will prevent the particles 218 of material 215 from being carried out of position by the gas stream or condensate, and from becoming projectiles in the event of failure of vessel 201.

FIG. 4 shows another embodiment of the invention in which the particles 301 of filler material are hollow or porous and so designed that steam or other pressurized gas will penetrate the particles and be released therefrom at a controlled rate. Particles 301, for example, are hollow spheres having orifices 302 and 303 connecting their exterior to the interior 304. Thus, pressurized gas will be contained within the sphere and in the event of pressure reduction within or of failure of the vessel within which particles 301 are contained, the pressurized gas within space 304 will be released slowly through orifices 302 and 303.

Filler material comprised of particles 301 is particularly adapted for pressurized vessels such as are found in steam boilers, generators or storage tanks which must generate and store a significant volume of high pressure steam to take care of intermittent short-term demands exceeding the rate of generation of steam by the unit. Spheres 301 may be made of any appropriate material such as glass, metal or plastic such as certain high temperature types including "Lexan" polycarbonate manufactured by General Electric Corp. Filler material using particles 301 could also be used in rolls or other pressurized vessels, and are particularly useful where the vessel is subject to high rates of change in thermal load, the hollow elements providing a safe source of accumulated steam.

FIG. 5 shows another embodiment of a filler material particle, indicated at 401, utilizable for the same purposes as described above with respect to particle 301. Particle 401 comprises a suitable foamed material such as a foamed metal or foamed urethane having interconnected cells 402. These cells will accumulate and release steam or other pressurized gas at a controlled rate.

I claim:

1. In combination with a closed pressurized steam heated roll type vessel having a predetermined volume and means for the introduction of pressurized gas into said vessel, the improvement comprising a loose filler material occupying most of said predetermined volume, said filler material being made up of particles with the volume of each particle having a relatively low average density, the total weight of each particle being less than that which would cause serious bodily injury when traveling at high velocity, whereby upon failure of said pressurized vessel said particles will not become dangerous projectiles, each particle being independently movable with respect to the others and with respect to the interior surfaces of said vessel.

2. The combination according to claim 1, said particles being impervious to said pressurized gas.

3. The combination according to claim 1, said particles being pervious to said pressurized gas through restricted passages therein, whereby pressure reduction within or failure of the pressurized vessel will permit release of the gas from the interior of the particles at a controlled rate.

4. The combination according to claim 3, said particles comprising hollow spheres with small orifices therein.

5. The combination according to claim 3, said particles comprising foamed material with interconnected cells.

6. The combination according to claim 1, said pressurized vessel comprising a steam heated roll, means for delivering steam to said roll, and siphon means for withdrawing condensate from said roll.

7. The combination according to claim 6, said siphon being stationary and connected to the lowest point on the roll interior.

8. The combination according to claim 6, said siphon having radial arms within the roll extending to different points on the interior and rotating with the roll.

9. The combination according to claim 6, said siphon comprising an axial stationary siphon pipe, a plurality of rotating radial siphon tubes within the roll and means successively connecting the rotating siphon tubes to the stationary pipe as each tube reaches the lowest point of its rotation.

10. The combination according to claim 1, further provided with porous screen means enclosing said particles to prevent them from becoming projectiles in the event of vessel failure.

11. In combination with a closed pressurized steam heated roll type vessel having a predetermined volume and means for the introduction of pressurized gas into said vessel, the improvement which comprises particles occupying most of said predetermined volume, said particles being pervious to said pressurized gas through restricted passages therein and having open interior space for the reception of pressurized gas through said passages, whereby pressure reduction within the volume of the pressurized vessel due to failure of the vessel will permit release of the gas from said interior space of said means at a controlled rate, the sizes of said restricted passages relative to said open interior space being such that said controlled release will prevent serious bodily injury upon said vessel failure, each particle being independently movable with respect to the others and with respect to the interior surfaces of said vessel.

* * * * *